United States Patent
Welz et al.

(10) Patent No.: US 11,094,016 B1
(45) Date of Patent: Aug. 17, 2021

(54) FULL BALANCE SHEET ADVISOR

(71) Applicant: Wells Fargo Bank, N.A., San Francisco, CA (US)

(72) Inventors: Scott Welz, Kirkwood, MO (US); Elizabeth Ingram, St. Louis, MO (US); Gwendoria M. Salley, Rock Hill, SC (US); Rodney J. Sayegh, Astoria, NY (US); Patrick Rodman, St. Louis, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 641 days.

(21) Appl. No.: 15/146,390

(22) Filed: May 4, 2016

(51) Int. Cl.
| | |
|---|---|
| *G06Q 40/00* | (2012.01) |
| *G06Q 40/06* | (2012.01) |
| *H04L 29/08* | (2006.01) |
| *G06Q 40/02* | (2012.01) |
| *G06N 7/00* | (2006.01) |
| *G06N 20/00* | (2019.01) |

(52) U.S. Cl.
CPC ............ *G06Q 40/06* (2013.01); *G06N 7/005* (2013.01); *G06N 20/00* (2019.01); *G06Q 40/02* (2013.01); *H04L 67/306* (2013.01)

(58) Field of Classification Search
CPC .................................................... G06Q 40/06
USPC ........................................................ 705/36 R
See application file for complete search history.

(56) References Cited

U.S. PATENT DOCUMENTS

| | | | |
|---|---|---|---|
| 7,966,235 B1 | 6/2011 | Capelli et al. | |
| 8,181,858 B2 | 5/2012 | Carter et al. | |
| 8,605,885 B1 | 12/2013 | Wooters | |
| 8,635,132 B1* | 1/2014 | Wilks | G06Q 40/06 705/35 |
| 8,700,512 B1* | 4/2014 | Kuznetsov | G06Q 40/00 705/35 |
| 9,424,840 B1 | 8/2016 | Hart et al. | |
| 10,223,754 B1 | 3/2019 | Lopez et al. | |
| 2002/0095363 A1 | 7/2002 | Sloan et al. | |
| 2003/0158766 A1 | 8/2003 | Mital et al. | |
| 2003/0191719 A1 | 10/2003 | Ginter et al. | |
| 2005/0060221 A1 | 3/2005 | Kolar et al. | |
| 2005/0096973 A1 | 5/2005 | Heyse et al. | |
| 2005/0144108 A1 | 6/2005 | Loeper | |
| 2005/0154635 A1 | 7/2005 | Wright et al. | |
| 2006/0074788 A1 | 4/2006 | Grizack et al. | |
| 2010/0161399 A1 | 6/2010 | Posner et al. | |

(Continued)

OTHER PUBLICATIONS

IEEE: Life Coach: Using Big Data and Analytics to facilitate the attainment of Life Goals. Author: Cazier J; Green, Jennifer. (Year: 2016).*

(Continued)

*Primary Examiner* — Bruce I Ebersman
*Assistant Examiner* — John A Anderson
(74) *Attorney, Agent, or Firm* — Schwegman Lundberg & Woessner, P.A.

(57) ABSTRACT

Disclosed in some examples are systems, machine readable mediums, and methods for providing a Full Balance Sheet Advisor (FBSA). The FBSA may be a network based service accessible to users using one or more computing devices. The FBSA may be accessed using a web-browser, or a dedicated FBSA application. The FBSA looks at the user's full balance sheet to provide advice on how the user can meet their financial goals.

12 Claims, 5 Drawing Sheets

(56) References Cited

U.S. PATENT DOCUMENTS

| | | | |
|---|---|---|---|
| 2010/0280935 A1 | 11/2010 | Fellowes et al. | |
| 2011/0112985 A1* | 5/2011 | Kocmond | G06Q 40/06 705/36 R |
| 2013/0060692 A1 | 3/2013 | Typrin et al. | |
| 2014/0164953 A1 | 6/2014 | Lynch et al. | |
| 2014/0244712 A1 | 8/2014 | Walters et al. | |
| 2014/0279190 A1 | 9/2014 | Severinghaus et al. | |
| 2014/0310002 A1 | 10/2014 | Nitz et al. | |
| 2015/0220951 A1* | 8/2015 | Kurapati | H04M 15/83 705/7.33 |
| 2015/0220999 A1* | 8/2015 | Thornton | H04M 15/8011 705/14.66 |
| 2015/0379488 A1 | 12/2015 | Ruff et al. | |
| 2016/0027102 A1 | 1/2016 | Smith et al. | |
| 2016/0239848 A1 | 8/2016 | Chang et al. | |
| 2016/0321935 A1 | 11/2016 | Mohler et al. | |
| 2016/0350858 A1 | 12/2016 | Dintenfass et al. | |
| 2017/0078224 A1 | 3/2017 | Chander et al. | |
| 2017/0099525 A1* | 4/2017 | Ray | G06Q 30/0275 |
| 2017/0357480 A1 | 12/2017 | La Placa | |

OTHER PUBLICATIONS

"U.S. Appl. No. 15/797,857, Non Final Office Action dated Aug. 21, 2019", 21 pgs.

"U.S. Appl. No. 15/797,857, Response filed Jul. 15, 2019 to Restriction Requirement dated May 15, 2019", 7 pgs.

"U.S. Appl. No. 15/797,857, Restriction Requirement dated May 15, 2019", 5 pgs.

U.S. Appl. No. 10/308,333, filed Dec. 2, 2002, Mital, Vijay, et al.

U.S. Appl. No. 10/665,179, filed Sep. 17, 2003, Kolar, Bradley D, et al.

U.S. Appl. No. 10/954,789, filed Sep. 30, 2004, Wright, Ann C, et al.

U.S. Appl. No. 11/014,378, filed Dec. 15, 2004, Loeper, David B.

U.S. Appl. No. 13/710,971, filed Dec. 11, 2012, Lynch, Timothy, et al.

U.S. Appl. No. 15/042,100, filed Feb. 11, 2016, Chang, Andrew Liang, et al.

"U.S. Appl. No. 15/797,857, Advisory Action dated Mar. 2, 2020", 3 pgs.

"U.S. Appl. No. 15/797,857, Final Office Action dated Sep. 1, 2020".

"U.S. Appl. No. 15/797,857, Non Final Office Action dated Apr. 9, 2020".

"U.S. Appl. No. 15/797,857, Response filed Feb. 20, 2020 to Final Office Action dated Dec. 20, 2019", 12 pgs.

"U.S. Appl. No. 15/797,857, Response filed Jul. 8, 2020 to Non Final Office Action dated Apr. 9, 2020", 13 pgs.

"U.S. Appl. No. 15/797,857, Advisory Action dated Nov. 25, 2020", 3 pgs.

"U.S. Appl. No. 15/797,857, Non Final Office Action dated Jan. 8, 2021".

"U.S. Appl. No. 15/797,857, Response filed Oct. 30, 2020 to Final Office Action dated Sep. 1, 2020".

"U.S. Appl. No. 15/797,857, Final Office Action dated May 20, 2021", 11 pgs.

"U.S. Appl. No. 15/797,857, Response filed Apr. 5, 2021 to Non Final Office Action dated Jan. 8, 2021", 13 pgs.

* cited by examiner

FULL BALANCE SHEET ADVISOR

TECHNICAL FIELD

Embodiments pertain to automated systems and methods for providing automated full balance sheet advisement. Some embodiments relate to Graphical User Interfaces (GUIs) for automated full balance sheet advisement.

BACKGROUND

Automated portfolio management systems (e.g., robo-advisors) are computerized systems that provide automated investment portfolio management services. These services utilize algorithms to trade, adjust, and manage a user's stocks and bonds.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
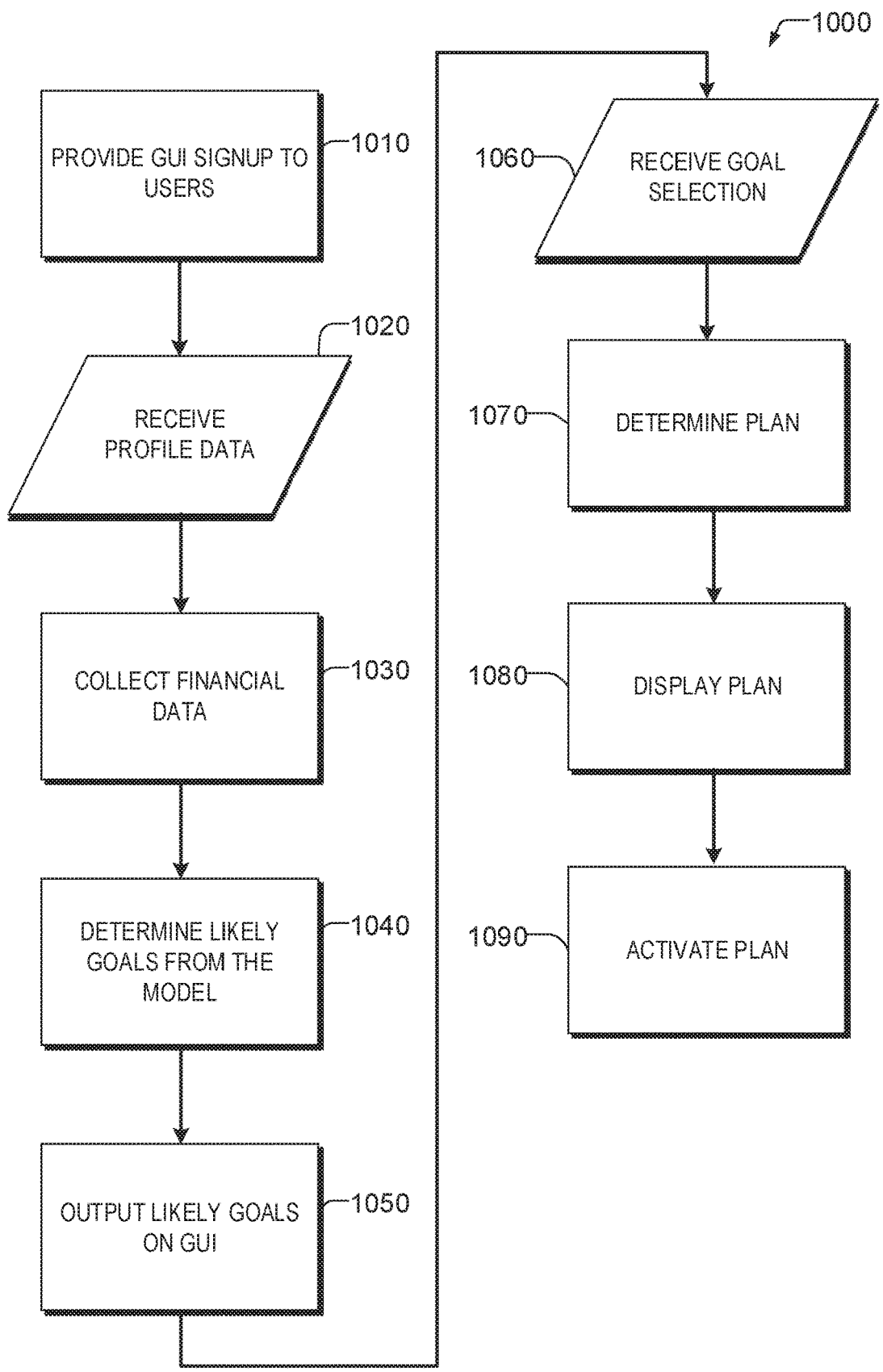
FIG. 1 illustrates a flowchart of a method of a user creating an account with the FBSA according to some examples of the present disclosure.

While automated portfolio management systems help users make investment decisions, these systems have not been applied outside the investment context. For example, while automated portfolio management systems may recommend certain investments to a user, the system's lack of knowledge of the entire financial picture of the user, including debt obligations causes the advice to be incomplete. For example, a particular stock investment may be earning a good interest rate, however, the consumer may have a large amount of credit card debt that is at a higher interest rate. The best financial advice may be to invest additional funds to pay down the credit card debt rather than increasing the amount of investment in the stock. Traditional automated portfolio management systems cannot provide this advice as they are not tied into a complete picture of the user's financial health.

Disclosed in some examples are systems, machine readable mediums, and methods for providing a Full Balance Sheet Advisor (FBSA). The FBSA may be a network based service accessible to users using one or more computing devices. The FBSA may be accessed using a web-browser, or a dedicated FBSA application. The FBSA is an automated, full-balance sheet financial advisor that looks at the user's full financial picture that provides advice on what goals the user should be focusing on, provides plans on how the user can meet those financial goals, tracks goal progress, tracks plan adherence, modifies goals and plans in response to plan and goal adherence, and the like.

Customers of the FBSA may access the FBSA over a network. Customers create an account with a profile containing financial and demographic information of the user. The FBSA may compare the profile of the user with similar profiles of other FBSA users to suggest financial goals to the user. Users may select one or more of the suggested financial goals, modify those goals, or select other financial goals (that were not suggested) from a predetermined list of financial goals. The FBSA then creates an action plan to achieve these goals based upon the financial goals and the user's current finances. In some examples, the user's profile on the FBSA is linked to their spouse's profile to offer a more complete financial picture.

The FBSA system then monitors the finances of the user and adjusts both the financial plan of the user, and the user's financial plans and goals in response to events relating to the user's finances. For example, the FBSA system may monitor user spending and adjust a user's budget as a result of this spending activity some examples, goals may need adjustment if goals are achieved, or become un-achievable. In this case, the FBSA system may automatically adjust the goals, or may notify the user to manually adjust them.

In some examples, the FBSA may provide rewards, reminders, and motivation to encourage members to stay focused on their financial goals through mobile device alerts, social networking posts, emails, text messages, and the like. For example, the FBSA may allow members to create budgets based upon categories of expenses. The FBSA may track a member's spending and may determine that the member is near a budget limit for a particular category of purchases. The FBSA may then notify the member that they are near their budget for a particular category of purchase throughout the month. In other examples, the FBSA system may provide rewards to users for achieving their goals or adhering to their financial plan. For example, the FBSA system may have rewards points that allow users to cash in the rewards points for money, merchandise, or loan points. In other examples, the FBSA system may report a user's adherence to their budget or other financial plan (or lack thereof if that is the case) to achieve their goals to one or more internal or external financial institutions. These financial institutions may utilize this information in determining whether to extend credit or other products to the user.

In some examples, the financial goals and the plan to achieve those goals may change over time in response to life events. For example, the user may report that they have gotten married, had a baby, experienced a death in the family, and the like. The FBSA may automatically recalculate the user's goals (by inputting the user's new information into the machine learning model and recalculating the goals) and may present any changes that the system determines to the user for approval or modification. The FBSA may also allow users to model certain life events and the impact on their finances in order to get a clear picture of the impact of such an event (e.g., "if I have a baby, how does that affect my goals?").

A financial goal may be any financially related outcome desired by the user. Examples include one or more of: retirement goals (e.g., retire by 65 with 3 million in savings), savings goals, family financial goals (e.g., pay for college), housing goals (afford a particular house), and the like. A financial goal may have multiple components that may be customized for the user, for example one or more time-based components (e.g., an age of the user, a completion time—5 years from now, or the like)) and a target dollar amount component (e.g., an amount saved, earned, invested, and the like).

Based upon these goals, a financial plan may be created automatically by the FBSA system which determines financially what a particular user needs to do to accomplish that goal. The financial plan may comprise one or more financial actions for the user. For example "pay down the credit card debt," "invest in a 401(k)," and the like. Included in the financial plan may be a budget to achieve the user's financial goals. The FBSA may create a budget using the financial information and history known about the user. For example, the FSBA may contact a bank and receive information on the user's checking, savings, investment, loan, and credit card accounts from the bank. The FSBA may determine, based upon this information, an average amount spent on food, utilities, housing, medical, insurance, taxes, and other budgetary categories. The budget may be automatically populated using these numbers. The FBSA may also determine an income of the user based upon deposits in the user's bank account. In some examples, the FBSA may be linked to a mobile wallet account and receive purchase events through the mobile wallet account.

To achieve the desired goal, the created budget may be adjusted by the FBSA by creating new categories (e.g., a savings category, a debt payoff category, and the like) corresponding to a financial goal in which money is necessary and by budgeting money to those new categories by reducing spend rates on other categories. To pick which categories to take money from, each category may have a predetermined priority such that budgeting categories in lower priority levels may have money re-allocated from the lower priority levels to categories in higher priority levels as needed. These category priorities may be initial determined by an administrator of the FBSA and may be adjustable by users. Over time, as more and more users accept or adjust the FBSA's predetermined priorities, the predetermined priorities may be changed to reflect the average user's priorities.

As an example: a user's goal may be to retire by age 65 with $500,000 dollars in the bank. The FBSA financial plan may comprise:
1. Pay off the $10,000 credit card debt.
    a. Reduce discretionary spending category by $100/month and use to pay off credit card.
2. Once step #1 is complete, allocate the $100 from step 1a.) and the original $200 credit card payment to savings to build a three month emergency fund of $4,000.
3. Once step #2 is complete, allocate $300 from step 2 per month to mutual fund until $500,000 dollars is reached.

Financial plans may include budgets, steps associated with paying down debt, steps associated with investments (including asset allocation plans that depend on a user's age, risk tolerance, occupation, total investment goal, and the like), insurance, liabilities, and the like. Financial plans may include balance transfers between one or more existing financial accounts, or creating new accounts for a balance transfer. For example, a financial plan may be to take out a home equity line of credit at a lower interest rate to pay down credit card debt.

Turning now to FIG. 1, a flowchart of a method 1000 of a user creating an account with the FBSA is shown according to some examples of the present disclosure. At operation 1010 the FBSA system provides one or more GUIs to a computing device of the user. The FBSA system may provide the GUIs by sending to the computing device one or more GUI descriptors. Example GUI descriptors include one or more HyperText Markup Language (HTML) files, Content Style Sheets, JavaScript files, eXtensible Markup Language (XML) files, other data used to generate a user interface, and the like. GUI descriptors may be renderable by a general purpose application executing on the computing device of the user such as an Internet browser. In other examples, a GUI descriptor includes data provided to, or exchanged with, one or more specialized FBSA applications executing on the user's computing device in order to provide the GUI.

At operation 1020 the FBSA system receives information on the user. For example, the user may provide the information in response to a questionnaire presented by the GUI during the account creation process. In other examples, the user may have an existing relationship between the provider of the FBSA and at least part of this information may be retrieved from other systems to fill in the user's profile information. In other examples, the user may provide the FBSA access to external information sources. Example external information sources include banking institutions, investment institutions, tax preparation software, social networking services, geolocation services, and the like. At least part of the information received about a user may be retrieved from these external information sources. This information may be stored in a profile of the user. Information may include demographic information, financial information, and risk tolerance information. Demographic information may include one or more of: name, spousal information, family information (e.g., names and ages of dependents), age, marital status, gender, occupation, and the like. Financial information may include income information (when the user is paid and how much), bank account information, investment information, insurance information, credit card and debt information, mortgage information, and the like.

At operation 1030, the FBSA system may utilize the information collected at operation 1020 to collect financial information about the user. For example, the user may provide the FBSA with account information of financial institutions and provide the FBSA system with permission to access those accounts as part of operation 1020. The FBSA system then establishes a connection with these systems (e.g., over a network) and downloads account information. In some examples, these systems may be external third-party systems. Example information includes types of accounts, account balances, investments, insurance information, and the like. This information may be stored as part of the user's profile information and may be periodically monitored and updated (e.g., operation 1030 may be repeated every predetermined period of time).

The information collected at operations 1020 (the profile information) and 1030 is input into a machine learned model and predicted financial goals may be determined from that model at operation 1040. Financial goals are selected from a set of predetermined financial goals by the model. The model may be built using a supervised machine learning algorithm using labelled training data. Training data may be manually created profile data labelled with optimal goals given that profile data. In other examples, training data may comprise historical profile information that is labelled with financial goals manually chosen by those users. In other examples, training data may comprise both created and historical training data. Thus, the system may use past user's profile data, labelled with the goals those users have chosen, to predict a future, similar user's goals. In some examples, the model may be a logistic regression model. In other examples, the model may be a decision tree (e.g., trained using an algorithm such as Iterative Dichotomiser 3, C4.5, Classification and Regression Tree, Conditional Inference Trees, and the like), or a series of decision trees (e.g., a Random Forest). In other examples, other classification, or other machine learning algorithms may be utilized to assign one or more goals to the user. These other classification algorithms may employ supervised or unsupervised learning. In other examples, rather than a machine learned model, financial professionals may predetermine a decision tree which leads to predetermined financial goals.

At operation 1050 the predicted goals are output to the GUI. For example, the user may be presented with one or more goals that were determined from the model based upon their profile information. The user may then have the opportunity to select one or more of those goals, modify those goals, or reject all of the goals completely. The user's feedback and selection of those goals may then be used as training data (e.g., the user's profile is paired with their selections and used as training data) to periodically update the model. In this way, the model may be periodically refined. The goals actually selected may be termed the actual financial goals.

At operation 1060 the user's selected goals may be received by the FBSA system. At operation 1070 one or more financial plans are created for the user to assist the user in achieving their selected financial goals. In some examples, each financial goal in the set of predetermined financial goals has one or more corresponding financial plans. Determining the plan at operation 1070 then comprises looking up the financial plans corresponding to the goals determined from the user at operation 1060. In some examples, these plans may be customized for the user based upon the user's financial information. For example, the plans may have variables in them that are replaced by a user's financial information. For example, the plan may be of the form: "pay back $<x> of <debt type>" where the <x> is the amount of the user's loan and <debt type> is a type of debt (e.g., credit card debt, mortgage loan, and the like).

In some examples, goals may have more than one or in some cases many different financial plans associated with them. In these examples, the plans may have criteria associated with them. These criteria may indicate whether this plan is appropriate for the user. The criteria may include a number of financially focused if-then statements. For example, a criteria for a first financial plan in a first goal may include "if <user's total unsecured debt> is greater than <⅓ of the user's yearly income> then use this financial plan else goto the criteria for the third financial plan." In this way, a predetermined decision tree may be utilized to select appropriate financial plans for the user. It is appreciated that in the example criteria, the "<user's total unsecured debt>", "<⅓ of the user's yearly income>" will be replaced by the actual total of the user's unsecured debt and the user's yearly income*⅓.

At operation 1080 one or more financial plans may be displayed to the user in the GUI, The user may be able to approve or disapprove of the plan and modify it accordingly. For example, the user may change financial numbers in the plan, remove steps, add steps, re-order steps, or the like. Upon presentation of the plan, the system may graphically show the user the long term consequences of a particular plan. For example, the system may show the user their financial condition if they were to stick with the plan over a predetermined period of time. The system may project the financial condition of the user. For example, using average interest rates and by making certain assumptions for unknown elements in the prediction (e.g., that the user maintains their job and current level of pay). If the user chooses to modify the financial plan, the system may update the projected financial condition of the user. At operation 1090 when the user is satisfied with their financial plan, the plan is activated and stored in a data store in the FBSA system.

Figure 2:
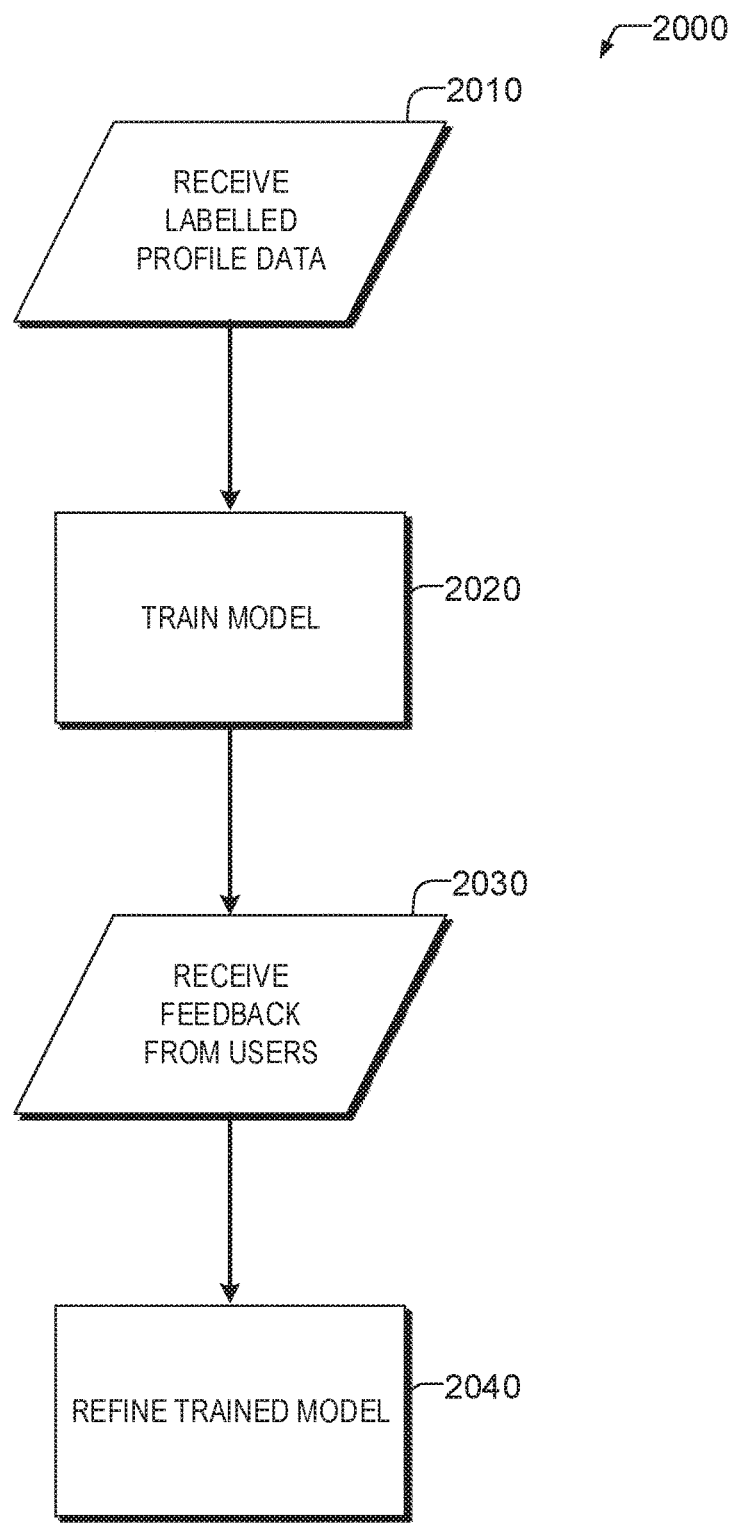
FIG. 2 illustrates a flowchart of a method of training and updating a model for determining financial goals of users according to some examples of the present disclosure.

Turning now to FIG. 2, a method 2000 of training and updating a model for determining financial goals of users is shown according to some examples of the present disclosure. At operation 2010 the system receives training profile data (including financial data) labeled with the optimal goals. In some examples, this profile data may be manually created and manually labelled with appropriate goals. In some examples, this may include profile data and goals from a large amount of users. For example, the FBSA system may operate for a large period of time before automatically suggesting financial goals, instead allowing users to select their goals from a list of predetermined goals. In some examples, both manually created and historical data may be used. The labelled goals are paired with the corresponding profile data (including financial data) to form (profile information, labelled goal) pairs and those pairs may be used to train a machine-learned model at operation 2020, such as a logistical regression model, a decision tree, or the like. In some examples, the logistical regression model may be fitted (trained) using a maximum likelihood estimation algorithm. Thus, the model may be trained through the use of historical user data. In some examples, the user's financial information may be fit into one or more groupings. For example, a user's income may be $123,000 but may be described as being in a $110,000-$120,000 group. This may reduce data sparsity when one or both of training the model and making predictions.

Once the system begins to make suggestions of goals, the system may utilize the explicit feedback given by users that the suggested goals are appropriate or not to the user. For example, if the user accepts the suggested goal, then this is positive feedback that reinforces the model. If the user rejects the suggested goal (e.g., selects a different goal), then this is negative feedback is used to update the model so that it has a better chance of getting it right for the next user. At operation 2030 this feedback is received and at operation 2040 the feedback is used to refine the model. In some examples, this is done by adding the profile data of the users from 2030 and their goal selections into the training data at operation 2010 and repeating operation 2020.

Figure 3:
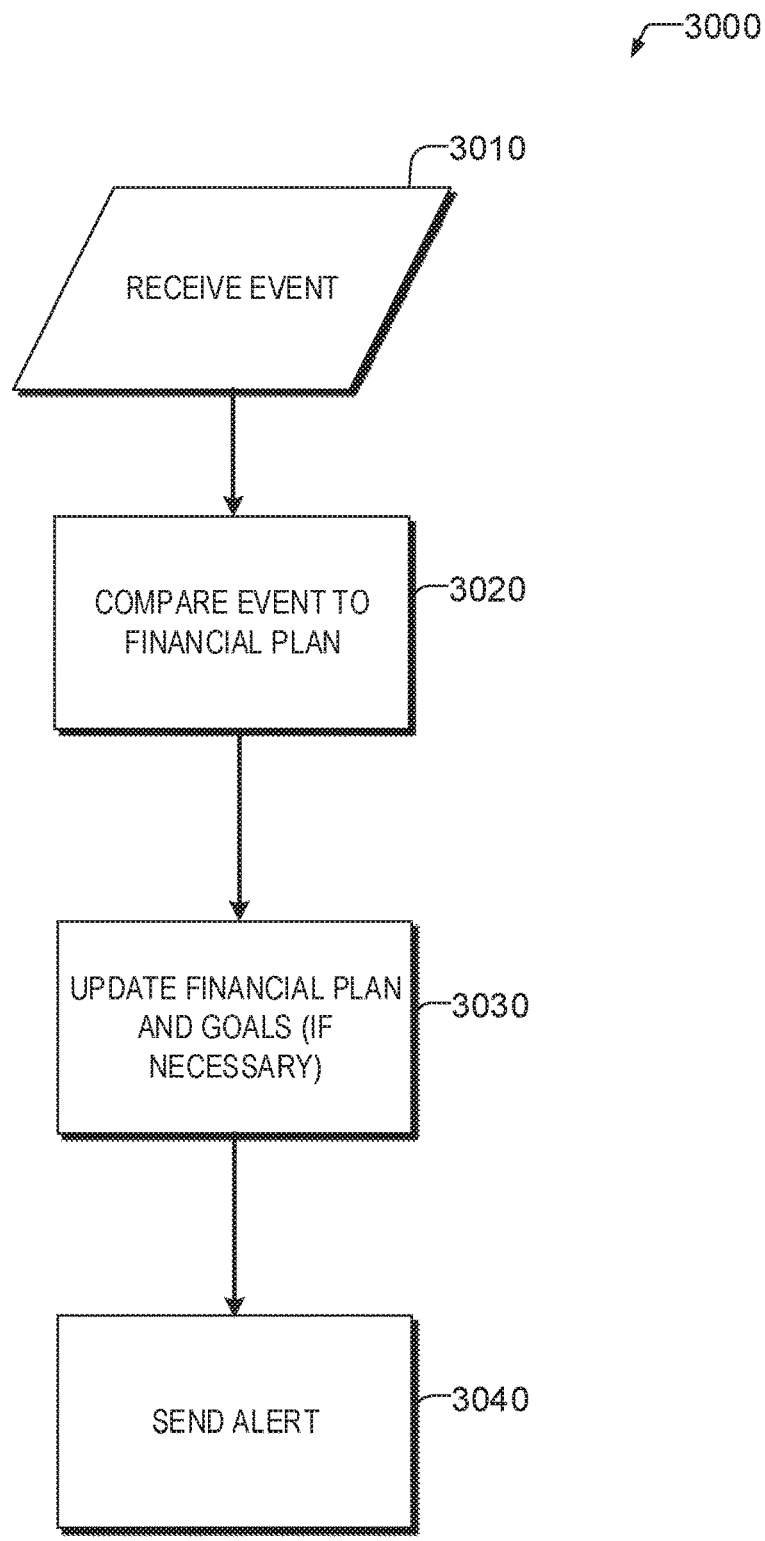
FIG. 3 illustrates a flowchart of a method of tracking adherence to a selected financial plan and progress towards the selected financial goals according to some examples of the present disclosure.

FIG. 3 shows an example of a method 3000 of tracking adherence to the selected financial plan and progress towards the selected financial goals according to some examples of the present disclosure. The operations of FIG. 3 may be performed by the system after the user is signed up, has determined their goals and their plan (e.g., after the operations in FIG. 1). At operation 3010, the FBSA system receives an event. An event may be any occurrence that impacts a user's financial goals or plans. The event receipt may be as a result of a periodic pull of the user's financial information (e.g., a request to a financial institution or other related network based service used by the user for financial information of the user), a "push" from a financial institution (e.g., a notification that there is activity associated with an account of the user), or an indication from the user through a GUI of the FBSA system.

At operation 3020 the impact of the event on the financial plan is evaluated and impact to financial goals is determined. Events may be classified into one or more categories, such as spending events, new account events, savings events, investment events, life events, and the like.

For spending events, the FBSA may assist users in staying on budget. The FBSA may receive events from a credit, debit, or bank account of the user. Each time the user makes a purchase the FBSA system may receive a notification comprising the amount and category of expenditure. In other examples, the FBSA may receive the amount and merchant or product of the expenditure. The FBSA may then map the merchant or product to a category. The financial plan may include a budget with limits for certain categories of spending. In response to the event, the FBSA may determine the total budget left in the category corresponding to the received alert after the purchase amount corresponding to the alert is subtracted, to determine whether the total budget is below a predetermined alert threshold. Additionally, if the total budget in that category is below zero, then changes may be made to the financial plan—such as reductions in a budget of another (lower priority) category to maintain a balance.

For new events indicating a newly created financial account, the impact to the financial plans depends on the type of new account. For new loan accounts, the FBSA may automatically adjust a financial plan (e.g., a budget) to account for the payments (which are included by the alert) by automatically shuffling budgeted amounts from lower priority categories. As already noted, funds may be shuffled using priority schemes where each category is prioritized according to importance. If a higher priority category is short of funds, funds may be budgeted from the lowest priority category on the list with available funds. For new savings, brokerage accounts, and other types of accounts the FBSA system may take no action, or may ask the user if they would like to setup an automatic payment to these accounts to establish a savings or investment.

As another example, the event may include savings or investment events. For example, the user may transfer money into a savings account in accordance with the financial plan. As the financial plan may comprise multiple steps, each step may be dependent on the satisfaction of the previous plan step. For example, the user's financial goals may be to retire with $3,000,000 in the bank. A financial plan may comprise three steps: 1. Pay off all debt 2. Save a three month emergency fund and 3. Begin investing 20% in a mutual fund. Upon receiving an indication that step 2 has been satisfied by the depositing of the full three months of emergency funds into a bank account of the user, the system may transition the user to step 3. The system may automatically put funds previously budgeted for saving the three month emergency fund into the investment of the user's choice. In other examples, the user may login and change the allocation of funds.

In some examples the FBSA may automatically route funds. In some examples, the FBSA may be linked with the user's financial institutions and may automatically enforce financial plans and goals. For example, the user may be prevented from making purchases outside of their budgeted categories using a credit or debit card.

For life events, the FBSA system may not initially take any action, but instead may suggest changes to the user's goals. For example, the FBSA may re-submit the user's profile information to the model to determine if the current goals still align with the user's likely goals. The user may be prompted to add or change their goals if the model indicates they are likely to have different goals as the result of the life event.

In some examples, at operation 3030, goals may also be changed. For example, certain events may make achievement of a goal unrealistic. For example, the user's goal may be to retire at 56 years old with $500,000 saved in retirement. If the user is 50, makes only $50,000 a year, has only saved $250,000 and missed making a necessary deposit in the retirement account, the user may be mathematically unlikely (e.g., with a probability of less than a predetermined percent) to reach the user's goals. In this case, the goal is adjusted to a more realistic goal at operation 3030 and the user may be notified at operation 3040. In this example, the retirement savings goal is adjusted down to a number that is above a predetermined probability (e.g., an 80 percent probability given current and historic interest rates). In other examples, the age target for the goal can be increased. In other examples, the user may choose how to modify the goal such that a realistic probability of success may be realized and the FBSA may present options and probabilities of success given the current financial state of the user.

At operation 3040, in some examples, the user may be notified of changes to their financial plans, or goals through one or more alerts. In some examples, these alerts may be positive alerts ("Congratulations! You've just moved to step 3 of your financial plan! At this rate, you should have $3 million by retirement!") or negative alerts ("Caution! You are close to exceeding your food budget for this month. Consider allocating additional funds to the food budget from other categories, or consider reducing spending.") In other examples, they may be suggestions that a user change their goals (e.g., in response to receiving a notification of a life event). In other examples, alerts may comprise the addition of reward points or reward funds to a user's reward account. In still other examples, the alerts may comprise removing reward points or reward funds as a result of a user not complying with the financial plan.

In the examples in which alerts are communications to users, alerts may be text messages, notifications on an FBSA application residing on a user's computing device (e.g., an application that communications with the FBSA service over a network), an email, a voicemail, a post to a social networking account of the user, and the like. For example, the FBSA system may "friend" the user on a social networking service and may use that connection to send the alerts (which may be private or public).

Figure 4:
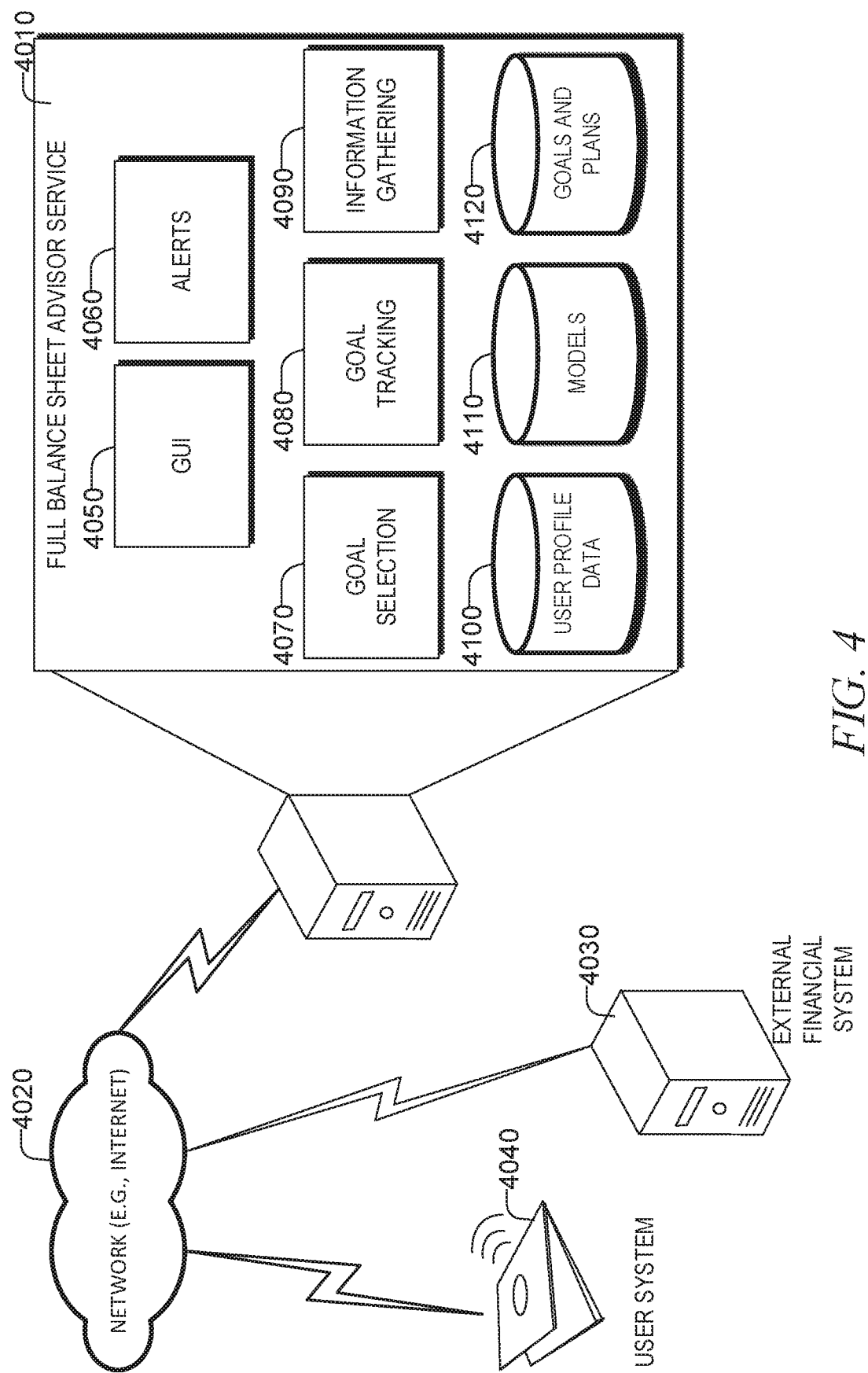
FIG. 4 illustrates a block diagram of a FBSA service and associated exemplary operational environment according to some examples of the present disclosure.

Turning now to FIG. 4, a block diagram of a FBSA service 4010 and associated operational environment is shown according to some examples of the present disclosure. FBSA service 4010 may communicate over a network, such as network 4020 (e.g., portions of the Internet, an Intranet, or the like) with external financial systems, such as external financial system 4030 and user systems, such as user system 4040. FBSA system may include a GUI module 4050 which may provide one or more user interface descriptors (or other data) to user systems, such as user system 4040 to provide one or more user interfaces of the FBSA system to users of user systems, such as user system 4040. For example, GUI module 4050 may be a web-server.

Alerts module 4060 may be instructed by goal tracking module 4080 to send one or more alerts. For example, in response to an event that changes (positively or negatively) a goal or a financial plan, such as at operation 3040 of FIG. 3. The alerts module 4060 may determine what type of alert to send based upon preferences in a user profile stored in the user profile data store 4100. The alert module may send alerts as text messages, emails, voice mails, prompts on a GUI of the FBSA system (e.g., by working with GUI module 4050), and the like.

Goal selection module 4070 may use user profile data from the user profile data store 4100 and financial information from external financial system 4030 (and in some examples, a financial system integrated with a FBSA) as inputs into a machine learned model stored in model storage data store 4110 to determine financial goals of a user. These financial goals may be one or more goals from a predetermined list of financial goals stored in the goals and plans data store 4120. Goal selection module 4070 may then pass the determined goals to the GUI module 4050 for presentation of the determined goals to the user. GUI module 4050 may then ask for the user to select goals they are interested in and allow users to make any modifications. These selections may then be passed back to the goal selection module 4070. Goal selection module 4070 may add the user's selections to a training data set along with their profile information which may be utilized by the goal selection module 4070 to refine the model. The model may be refined by re-training the model on the training data set—this time, including the newly added training data. Goal selection module 4070 may also be responsible for initially creating the model based upon the training data set.

Goal selection module 4070 may also determine one or more financial plans for the users to determine their goals as described above. These financial plans are then passed back to the GUI module 4050 for approval and/or modification. Information on the user's chosen financial goals, and financial plans are stored in the user profile data store 4100. Once one or more plans are approved, the goal tracking module 4080 works with information gathering module 4090 to gather information about the user to track the user's compliance with the financial plans and progress toward goals. For example, the information gathering module 4090 may receive or request updates to the user's financial information. This information may be passed to the goal tracking module, which may compare the information (e.g., the financial event) to the financial plan, update the financial plan and goals if necessary, and instruct the alerts module 4060 if an alert is necessary (e.g., FIG. 3).

Figure 5:
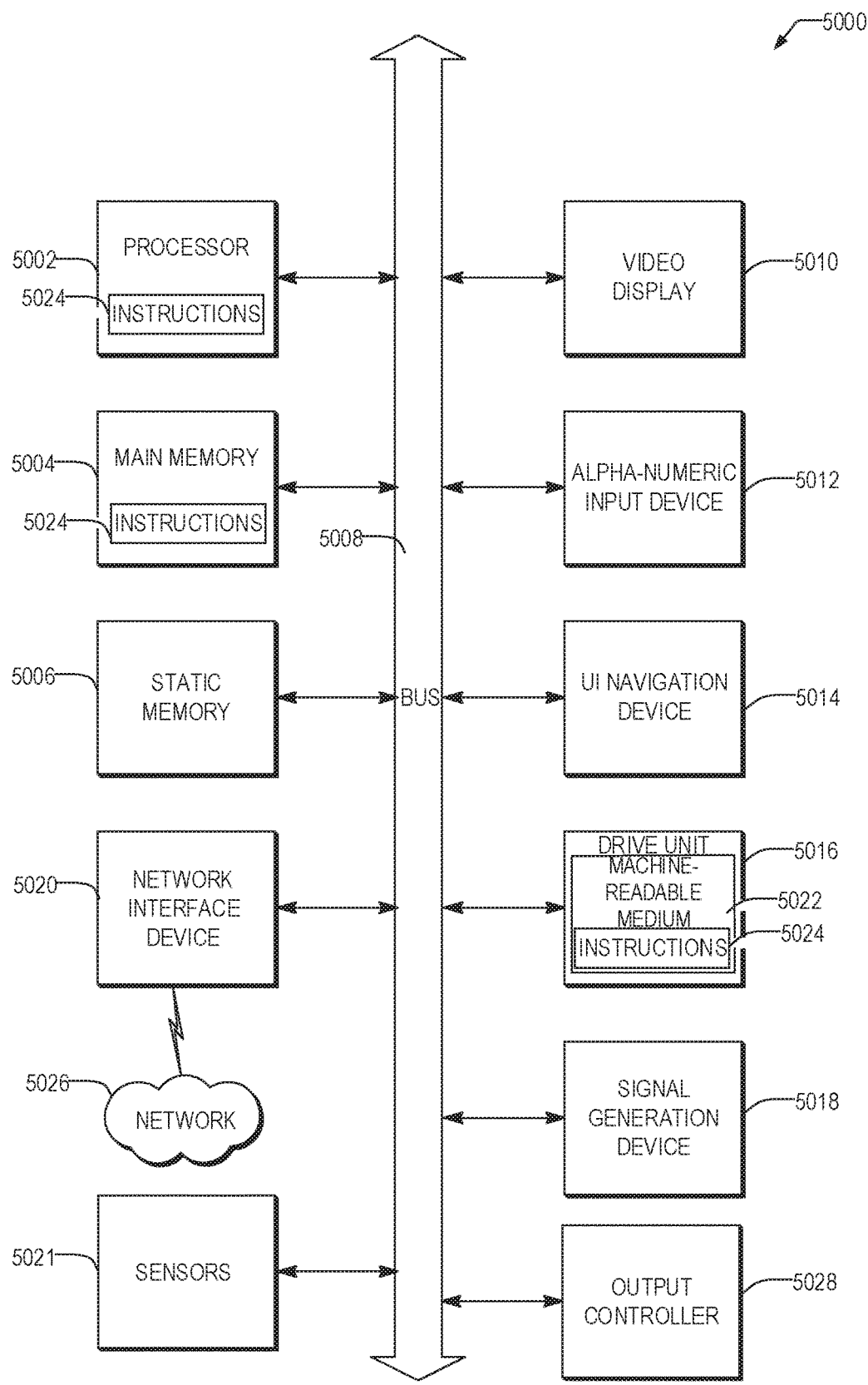
FIG. 5 is a block diagram illustrating an example of a machine upon which one or more embodiments may be implemented according to some examples of the present disclosure.

FIG. 5 illustrates a block diagram of an example machine 5000 upon which any one or more of the techniques (e.g., methodologies) discussed herein may perform. In some examples, the FBSA service may execute upon one or more machines, such as machine 5000. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet; coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

What is claimed is:

1. A method comprising:
  using one or more computer processors:
    providing a graphical user interface to a user with a questionnaire;
    receiving profile information of the user, the profile information of the user elicited from the user via the questionnaire, the profile information comprising demographic information and financial account information;
    receiving, from a computing device over a network, financial information about the user based upon the financial account information;
    applying, by the one or more processors, a logistic regression model to the financial information to generate a reduced sparsity financial information set, wherein application of the logistic regression model groups information items of the financial information into groupings based on fit using a maximum likelihood estimation algorithm, wherein grouping the information items includes placing an information item into a group of the groupings when a value of the information item is outside of a defined range of values for the group, and wherein the fit determines that the information item value is closer to values of the group than another group;
    training a supervised machine-learned model by creating a logistic regression model using a maximum likelihood estimation on historical profile information, the historical profile information labeled with previously selected goals by a plurality of users comprising a plurality of (profile information, labelled goal) pairs;
    determining a predicted financial goal of the user by inputting the profile information and the reduced sparsity financial information to the supervised machine-learned model;
    receiving confirmation that the predicted financial goal of the user is an actual financial goal of the user;
    developing a financial plan to achieve the predicted financial goal;
    receiving a financial event corresponding to the user;
    determining that the financial event indicates a deviance from the financial plan; and
    responsive to determining that the financial event indicates a deviance from the financial plan:
      modifying the financial plan to account for the deviance using the supervised machine-learned model; and
      sending an alert to the user via the network.

2. The method of claim 1, wherein the alert is one of: a text message, an email, an application alert, and a voicemail.

3. The method of claim 1, wherein responsive to receiving the financial event corresponding to the user, determining that a probability of the user achieving the predicted financial goal is below a predetermined percent, and in response to determining that the probability of the user achieving the predicted financial goal is below the predetermined percent, modifying the predicted financial goal so that a probability of the user achieving the modified goal is above a second predetermined percentage threshold.

4. The method of claim 1, wherein the financial information includes a financial account balance.

5. A system comprising:
  a processor;
  a memory, coupled to the processor, and containing instructions, which when performed by the processor, causes the processor to at least perform operations to:
    provide a graphical user interface to a user with a questionnaire;
    receive profile information of the user, the profile information of the user elicited from the user via the questionnaire, the profile information comprising demographic information and financial account information;

receive, from a computing device over a network, financial information about the user based upon the financial account information;

apply a logistic regression model to the financial information to generate a reduced sparsity financial information set, wherein application of the logistic regression model groups information items of the financial information into groupings based on fit using a maximum likelihood estimation algorithm, wherein grouping the information items includes placing an information item into a group of the groupings when a value of the information item is outside of a defined range of values for the group, and wherein the fit determines that the information item value is closer to values of the group than another group;

train a supervised machine-learned model by creating a logistic regression model using a maximum likelihood estimation on historical profile information, the historical profile information labeled with previously selected goals by a plurality of users comprising a plurality of (profile information labelled goal) pairs;

determine a predicted financial goal of the user by inputting the profile information and the reduced sparsity financial information to the supervised machine-learned model;

receive confirmation that the predicted financial goal of the user is an actual financial goal of the user;

develop a financial plan to achieve the predicted financial goal;

receive a financial event corresponding to the user;

determine that the financial event indicates a deviance from the financial plan; and responsive to a determination that the financial event indicates a deviance from the financial plan:
modify the financial plan to account for the deviance using the supervised machine-learned model; and
send an alert to the user.

6. The system of claim 5, wherein the alert is one of: a text message, an email, an application alert, and a voicemail.

7. The system of claim 5, wherein the operations comprise: responsive to receiving the financial event corresponding to the user, determining that a probability of the user achieving the predicted financial goal is below a predetermined percent, and in response to determining that the probability of the user achieving the predicted financial goal is below the predetermined percent, modifying the predicted financial goal so that a probability of the user achieving the modified goal is above a second predetermined percentage threshold.

8. The system of claim 5, wherein the financial information includes a financial account balance.

9. A non-transitory machine-readable medium, comprising instructions, which when performed by a machine, causes the machine to perform operations comprising:

providing a graphical user interface to a user with a questionnaire;

receiving profile information of the user, the profile information of the user elicited from the user via the questionnaire, the profile information comprising demographic information and financial account information;

receiving, from a computing device over a network, financial information about the user based upon the financial account information;

applying a logistic regression model to the financial information to generate a reduced sparsity financial information set, wherein application of the logistic regression model groups information items of the financial information into groupings based on fit using a maximum likelihood estimation algorithm, wherein grouping the information items includes placing an information item into a group of the groupings when a value of the information item is outside of a defined range of values for the group, and wherein the fit determines that the information item value is closer to values of the group than another group;

training a supervised machine-learned model by creating a logistic regression model using a maximum likelihood estimation on historical profile information, the historical profile information labeled with previously selected goals by a plurality of users comprising a plurality of (profile information, labelled goal) pairs;

determining a predicted financial goal of the user by inputting the profile information and the reduced sparsity financial information to the supervised machine-learned model;

receiving confirmation that the predicted financial goal of the user is an actual financial goal of the user;

developing a financial plan to achieve the predicted financial goal;

receiving a financial event corresponding to the user;

determining that the financial event indicates a deviance from the financial plan; and responsive to determining that the financial event indicates a deviance from the financial plan:
modifying the financial plan to account for the deviance using the supervised machine-learned model; and
sending an alert to the user.

10. The non-transitory machine-readable medium of claim 9, wherein the alert is one of:
a text message, an email, an application alert, and a voicemail.

11. The non-transitory machine-readable medium of claim 9, wherein responsive to receiving the financial event corresponding to the user, determining that a probability of the user achieving the predicted financial goal is below a predetermined percent, and in response to determining that the probability of the user achieving the predicted financial goal is below the predetermined percent, modifying the predicted financial goal so that a probability of the user achieving the modified goal is above a second predetermined percentage threshold.

12. The non-transitory machine-readable medium of claim 9, wherein the financial information includes a financial account balance.

* * * * *